*(12)* United States Patent
Rodrigues et al.

(10) Patent No.: US 10,469,274 B2
(45) Date of Patent: Nov. 5, 2019

(54) LIVE INK PRESENCE FOR REAL-TIME COLLABORATION

(71) Applicant: Microsoft Technology Licensing, LLC, Redmond, WA (US)

(72) Inventors: Mavis Natasha Rodrigues, Redmond, WA (US); Michael Eugene Taron, Seattle, WA (US); Ian Mikutel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/639,490

(22) Filed: Jun. 30, 2017

(65) Prior Publication Data

US 2018/0302232 A1 Oct. 18, 2018

Related U.S. Application Data

(60) Provisional application No. 62/485,936, filed on Apr. 15, 2017.

(51) Int. Cl.
*H04L 12/18* (2006.01)
*G06T 11/00* (2006.01)
*G06F 17/24* (2006.01)

(52) U.S. Cl.
CPC ........ *H04L 12/1818* (2013.01); *G06F 17/241* (2013.01); *G06F 17/242* (2013.01); *G06T 11/001* (2013.01); *H04L 12/1822* (2013.01)

(58) Field of Classification Search
CPC ............... G06T 11/001; H04L 12/1818; H04L 12/1822; G06F 17/242; G06F 17/241
See application file for complete search history.

(56) References Cited

U.S. PATENT DOCUMENTS

| 7,167,585 | B2* | 1/2007 | Gounares | G06F 3/0481 345/173 |
| 7,698,660 | B2 | 4/2010 | Sanchez et al. | |
| 7,996,776 | B2 | 8/2011 | Parker et al. | |
| 8,438,489 | B2 | 5/2013 | Barthelmess et al. | |
| 9,579,572 | B2 | 2/2017 | Kropivny | |
| 2003/0007683 | A1 | 1/2003 | Wang et al. | |
| 2003/0038788 | A1* | 2/2003 | Demartines | G06F 3/0485 345/173 |
| 2004/0263486 | A1* | 12/2004 | Seni | G06F 3/0485 345/173 |
| 2005/0249415 | A1 | 11/2005 | Bartolome | |

(Continued)

FOREIGN PATENT DOCUMENTS

WO 2014066660 A2 5/2014

OTHER PUBLICATIONS

Hu, et al., "A Streaming Digital Ink Framework for Multi-Party Collaboration", In Proceedings of the 11th international conference on Intelligent Computer Mathematics, Published on: Jul. 8, 2012, 15 pages.

(Continued)

*Primary Examiner* — Abdullahi E Salad
(74) *Attorney, Agent, or Firm* — Talem IP Law, LLP

(57) ABSTRACT

A live ink presence indicator is provided to identify what users created what content when multiple users do real-time collaboration within an application using digital ink. A presence manager determines a presence region for a user and a suggested location for rendering a presence indicator.

20 Claims, 10 Drawing Sheets

(56) References Cited

U.S. PATENT DOCUMENTS

| | | | |
|---|---|---|---|
| 2006/0031755 A1* | 2/2006 | Kashi | G06F 17/242 715/201 |
| 2006/0093218 A1 | 5/2006 | Gounares et al. | |
| 2006/0197764 A1 | 9/2006 | Yang | |
| 2007/0143663 A1 | 6/2007 | Hansen et al. | |
| 2008/0114844 A1* | 5/2008 | Sanchez | G06F 9/543 709/206 |
| 2013/0346910 A1 | 12/2013 | Mason | |
| 2015/0116283 A1 | 4/2015 | Black et al. | |
| 2015/0338938 A1* | 11/2015 | Vong | H04L 65/403 345/179 |
| 2015/0371417 A1 | 12/2015 | Angelov et al. | |
| 2018/0293766 A1* | 10/2018 | Carlos | G06T 11/203 |
| 2018/0300302 A1 | 10/2018 | Holley et al. | |

OTHER PUBLICATIONS

Peterson, et al., "Grouping Strokes into Shapes in Hand-Drawn Diagrams", In Proceedings of the Twenty-Fourth AAAI Conference on Artificial Intelligence, vol. 10, Published on: Jul. 11, 2010, pp. 974-979.

Peterson, et al., "Real-Time Document Collaboration Using iPads", In Proceedings of the third workshop on Research advances in large digital book repositories and complementary media, Published on: Oct. 26, 2010, 5 pages.

"Livenote", Retrieved From: https://web.archive.org/web/20170301105500/https://www.livenote.org/, Retrieved on: Apr. 13, 2017, 1 Page.

"Inkerz", Retrieved From: https://web.archive.org/web/20170312060723/https://inkerz.com/product.html, Retrieved on: Apr. 13, 2017, 5 Pages.

Burigat, et al., "Visualizing Locations of Off-Screen Objects on Mobile Devices: A Comparative Evaluation of Three Approaches", In Proceedings of the 8th Conference on Human-Computer Interaction With Mobile Devices and Services, Sep. 12, 2006, pp. 239-246.

Collins, et al., "Bubble Sets: Revealing Set Relations With Isocontours Over Existing Visualizations", In Proceedings of IEEE Transactions on Visualizations and Computer Graphics, vol. 15, Issue 6, Nov. 2009, pp. 1009-1016.

Greenberg, et al., "Semantic Telepointers for Groupware", In Proceedings Sixth Australian Conference on Computer-Human Interaction, Nov. 24, 1996, pp. 54-61.

Jiang, et al., "Sketch-Based Cooperative Diagramming Tool for Conceptual Design", Published in Journal of Software, vol. 18, Dec. 2007, pp. 35-44.

Frisch, et al., "Off-Screen Visualization Techniques for Class Diagrams", In Proceedings of the 5th International Symposium on Software Visualization, Oct. 25, 2010, pp. 163-172.

"International Search Report and Written Opinion Issued in PCT Application No. PCT/US18/026158", dated Jul. 5, 2018, 14 Pages.

Saund, et al., "Perceptual Organization in an Interactive Sketch Editing Application", In Proceedings of Fifth IEEE International Conference on Computer Vision, Jun. 20, 1995, pp. 597-604.

Zurita, et al., "A Collaborative Face-To-Face Design Support System Based on Sketching and Gesturing", In Journal Advanced Engineering Informatics, vol. 22, Issue 3, Jul. 2008, pp. 340-349.

"Non Final Office Action Issued in U.S. Appl. No. 15/639,456", dated Nov. 1, 2018, 17 Pages.

"Final Office Action Issued in U.S. Appl. No. 15/639,456", dated Apr. 18, 2019, 22 Pages.

"Non-Final Action Issued in U.S. Appl. No. 15/639,456", dated Aug. 5, 2019, 23 Pages.

* cited by examiner

LIVE INK PRESENCE FOR REAL-TIME COLLABORATION

CROSS REFERENCE TO RELATED APPLICATION

This application claims the benefit of Provisional Patent Application Ser. No. 62/485,936, filed Apr. 15, 2017.

BACKGROUND

Content creation applications such as notebook applications, word processing applications, spreadsheet applications, and presentation applications are useful tools for generating and curating content. These and other content creation applications are increasingly including "inking" functionality that lets users input content and interact with the application (and content created therein) through using a pen or stylus (and sometimes fingers or other objects) in a manner evoking a pen on paper.

When multiple users begin to do real-time collaboration within an application using digital ink (a "digital inking environment"), it can be challenging to identify what users created what content.

BRIEF SUMMARY

Identifying users in a real-time collaboration in an inking environment is described. A visual "ink presence" indicator feature for collaboration-enabled content creation applications in an inking environment (where ink strokes are being input to a canvas interface) is provided.

The ink presence feature not only provides a visual indicator, in the form of a "presence indicator", with information about who inked some content and where the user has inked that content on the drawing canvas, but also can determine where on the canvas interface to place the presence indicator.

An ink presence feature of a collaboration-enabled content creation application includes a presence manager code that defines a presence region for where ink points are being drawn and determines whether incoming ink points are part of a same presence region or different presence regions. The presence manager code further determines a location for a presence indicator for each presence region and provides the location information to the renderer of the content creation application so that the presence indicator is displayed to a user via a graphical user interface of the content creation application.

A presence indicator can be a presence icon that helps to indicate that someone is inking at a location of the screen. In one embodiment, the presence indicator does not follow the ink points; rather, the presence indicator moves separately from the ink points. The presence indicator location can be based on a definable presence region and as the presence region increases in size in a manner such that new ink points satisfy certain criteria, the presence manager can adjust the location of the presence indicator for that presence region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
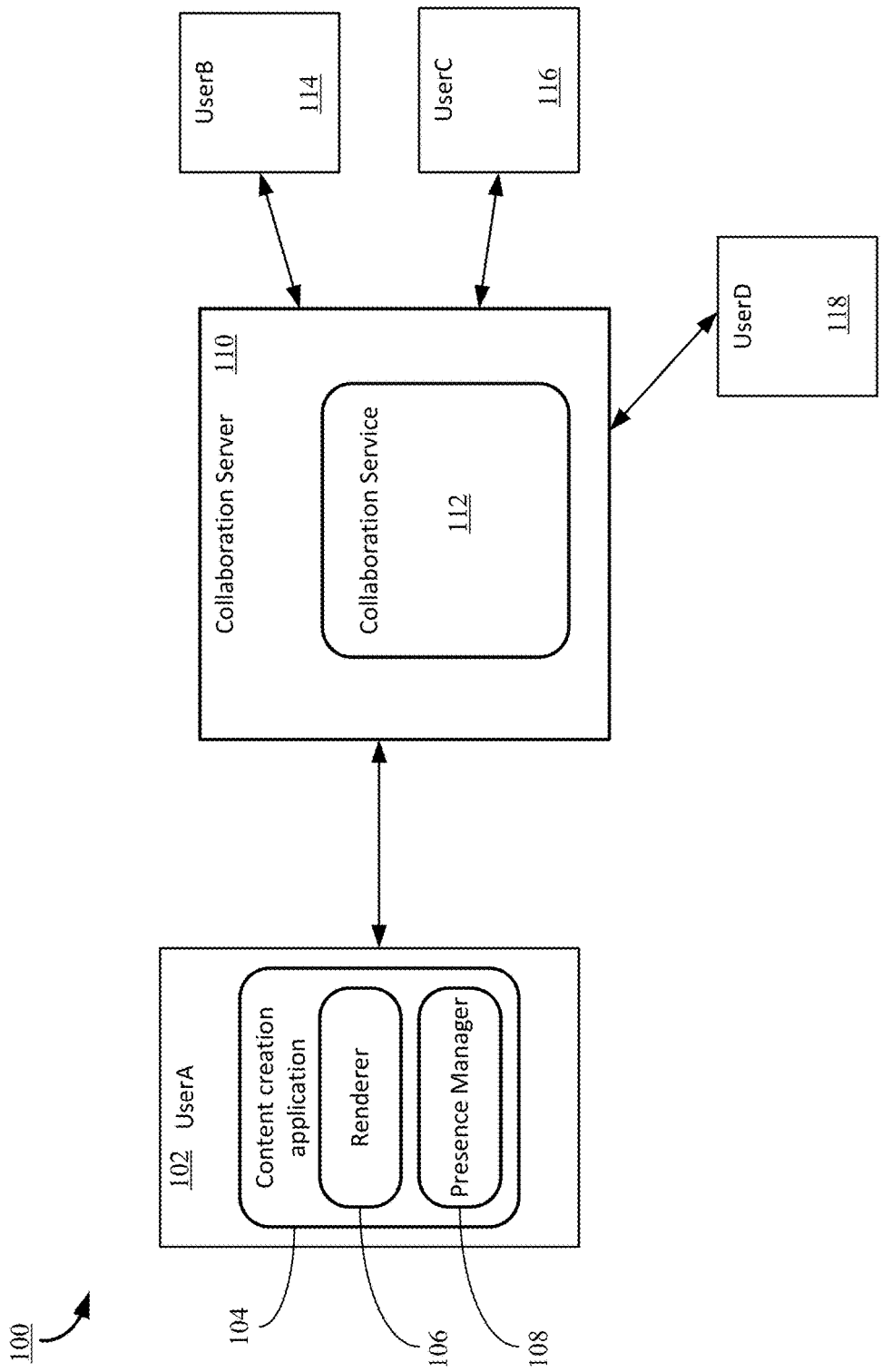
FIG. 1 illustrates an example operating environment in which various embodiments of the invention may be carried out.

Identifying users in a real-time collaboration in an inking environment is described. A visual "ink presence" indicator feature for collaboration-enabled content creation applications in an inking environment (where ink strokes are being input to a canvas interface) is provided.

Distinguishing between multiple users in a collaboration space can be challenging. Some collaborative inking environments utilize different color ink to represent different users in a similar fashion as carried out in a collaborative word processing environment (e.g., using a track-changes function in Microsoft Word). However, this can limit the ability of the multiple users to create colored content in the collaborative space. Furthermore, because a canvas interface allows for free form inking at effectively any place on the canvas, other users may be surprised by, or may overlook, someone's contributions. The ink presence feature not only provides a visual indicator, in the form of a "presence indicator", with information about who inked some content and where the user has inked that content on the drawing canvas, but also can determine where on the canvas interface to place the presence indicator.

Content creation applications are software applications in which users can contribute information. As used herein, content creation applications are directed to visual content where users can create text and/or image-based content in digital form. The term "content creation application" may in some cases be synonymous with "content authoring application", "productivity application", or "content authoring tool". Since the described systems and techniques focus on applications and tools through which content is being authored, there is no distinction intended between these terms and such terms may be used interchangeably herein.

The described ink presence feature is applicable for content creation applications that support collaboration and "inking" or "digital ink", which refers to the mode of user input where a stylus or pen (or even user finger on a touch screen or pad or possibly a mouse) is used to capture handwriting in its natural form.

An ink stroke refers to a set of properties and point data that a digitizer captures that represent the coordinates and properties of a "marking". It can be the set of data that is captured in a single pen down, up, or move sequence. The set of data can include parameters such as, but not limited to, a beginning of the stroke, an end of the stroke, the pressure of the stroke, the tilt (e.g., of a pen) for the stroke (can also be referred to as the azimuth), the direction of the stroke, the time and timing of the stroke between discrete coordinates along the path of the stroke, and the color of the 'ink'.

A digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected.

With digital ink, a user can easily control the appearance of the inked word or inked drawing, just like in the real world, because of the data structure (and language) of the ink strokes, which involve the above referenced parameters (e.g., coordinates, pressure, etc.). By remaining in the form of ink strokes, inked words, as well as inked drawings, are in an ink modifiable format.

In a collaboration-enabled content creation application (and even in non-collaboration scenarios), an ink stroke can be defined using a semantic event and associated metadata, which include the properties and point data. The semantic event can be start, continue, end, cancel, deletion, move, aggregate, and the like.

Figure 2:
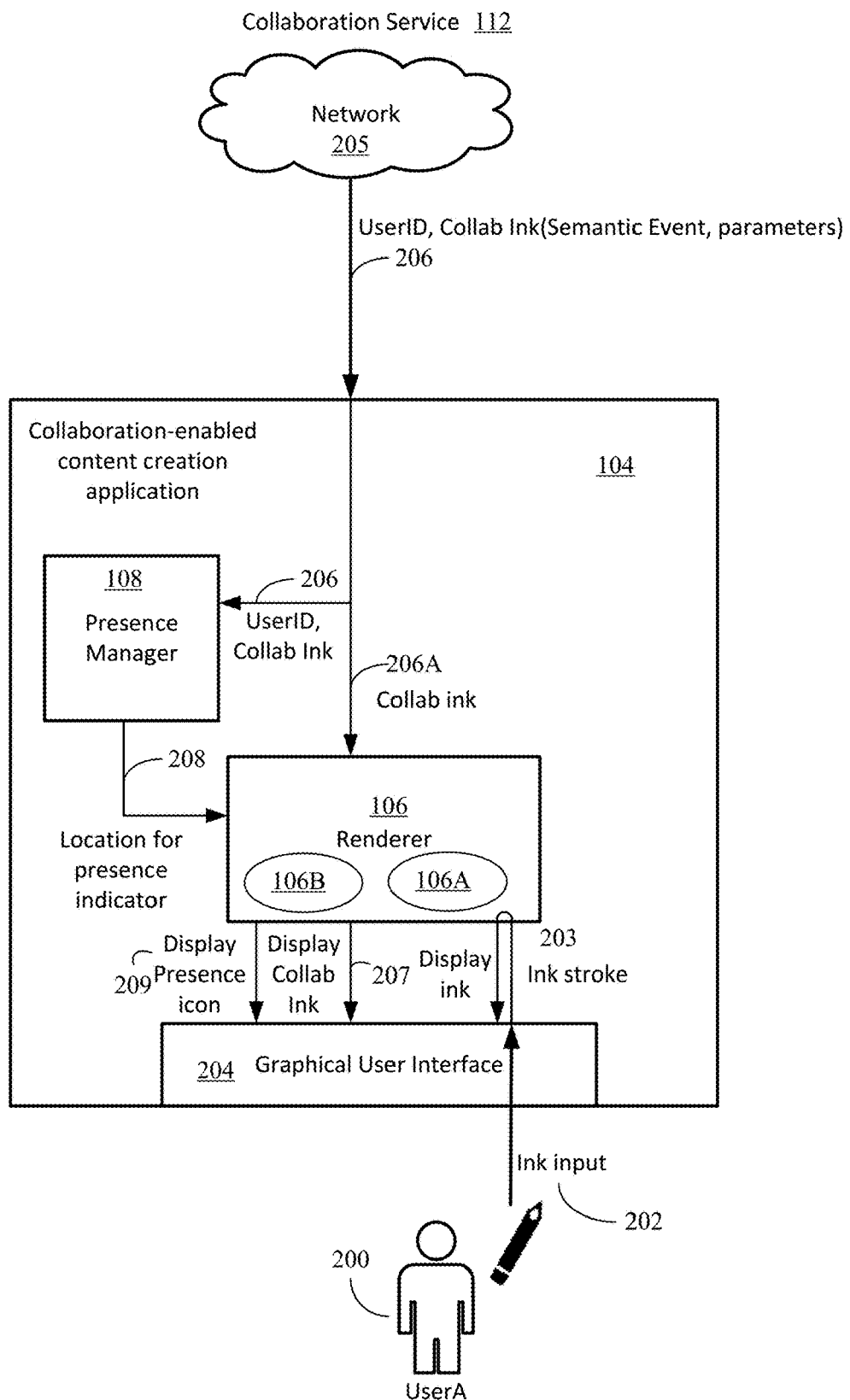
FIG. 2 illustrates an example system with a collaboration-enabled content creation application with ink presence feature.

FIG. 1 illustrates an example operating environment in which various embodiments of the invention may be carried out; and FIG. 2 illustrates an example system with a collaboration-enabled content creation application with ink presence feature.

Referring to FIG. 1, the example operating environment 100 includes a computing device 102 for UserA running a content creation application 104 with digital inking capabilities, including a Renderer 106 that can render ink input. A Presence Manager 108 is included to support live ink presence for real-time collaboration. A collaboration server 110 running a collaboration service 112 can support collaboration functionality for the content creation application 104 and facilitate collaboration between multiple users (e.g., UserB at computing device 114, UserC at computing device 116, and UserD at computing device 118). Collaboration service 112 allows for synchronizing information between users of a collaboration session.

Figure 7:
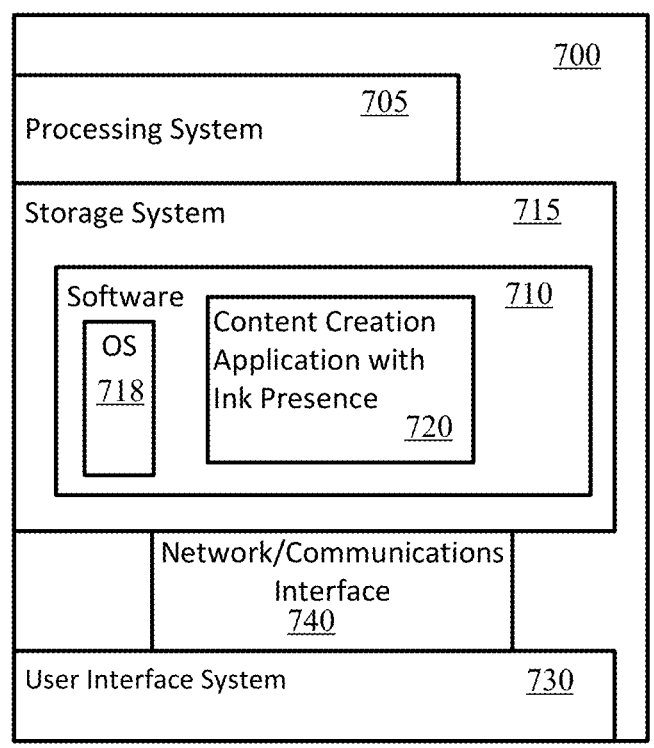
FIG. 7 illustrates components of a computing device that may be used in certain embodiments described herein.

The computing device 102 (as well as computing devices 114, 116 118, or other computing devices being used to participate in a collaboration session) may be embodied as system 700 such as described with respect to FIG. 7. For example, the computing devices can each be any computing device such as, but not limited to, a laptop computer, a desktop computer, a tablet, a personal digital assistant, a smart phone, a smart television, a gaming console, wearable device, and the like.

Referring to FIG. 2, the UserA 200 can input ink content ("ink input" 202) to the content creation application 104. Ink input 202 can be processed by a digitizer as an ink stroke 203 and rendered for display at the graphical user interface 204 by the Renderer 106 (e.g., using an object 106A that renders users' ink). In a collaboration session, the content creation application 104 is collaboration-enabled and communicates with the collaboration service 112 over a network 205 to transmit the ink stroke 203 and receive ink information from other users (e.g., "collab ink" 206A), which can be rendered by the Renderer 106 (e.g., using object 106A) as displayed ink 207 in the graphical user interface 204. The ink information can include at least an ink point for an ink stroke and a user identifier of the user inputting the ink stroke to the shared inking canvas. An ink point can have a data structure indicating position and other parameters (e.g., pressure, color). In some of the described implementations, an ink point can also include a semantic event.

Components (computing systems, storage resources, and the like) in the operating environment may operate on or in communication with each other over network 205. The network 205 can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network 205 may include one or more connected networks (e.g., a multi-network environment) including public networks, such as the Internet, and/or private networks such as a secure enterprise private network. Access to the network 205 may be provided via one or more wired or wireless access networks as will be understood by those skilled in the art.

The presence manager 108 "listens" to the strokes (e.g., ink points, semantic events, parameters) received by the application 104 and determines a best location to place a presence indicator (e.g., a presence icon). For example, the presence manager 108 can evaluate the input 206 of user id and ink information (UserID, Collab Ink (sematic event, parameters)) for a semantic event (e.g., start, continue, end) from the ink information 206A, determines a presence region for a user identified by the user id, and suggests a location for an ink presence indicator. This suggested location 208 is provided to the Renderer 106 to display the presence icon 209. In various implementations, the presence icon 209 can include a user's profile picture, initials, name, randomly selected background color or image, or user-selected color or image (or any combination of these items). The renderer 106 renders and animates the presence indicator, for example using an object 106B rendering the presence indicator.

The presence icon helps to indicate that someone is inking at a location of the screen. The presence icon does not have to follow the "live" ink (the ink appearing from co-collaborators in real-time that can be displayed as 207). Rather, the suggested location 208 for the presence indicator can be rendered separate from the inking 207 being rendered (see e.g., suggested location 208 with corresponding presence icon 209 and collab ink 206 with corresponding displayed ink 207). It is possible that the presence icon appears in the graphical user interface before the ink, at the same time as the ink, or (less preferably) after the start of the ink. The ink appearing logic is separate from the presence appearing logic, for example, by having separate objects 106A and 106B for renderer 106. An inking canvas allows for inking anywhere at any time (as opposed to restrictive lines for typing) and therefore could cause distracting motion if the presence icon followed ink points that may be on strokes made that cross each other from opposite ends, but form a cohesive picture. The separation of inking logic and presence appearing logic can help avoid the presence icon from jumping around too much on a canvas.

Communication to and from the components such as the presence manager 108 and/or the renderer 106 and/or the collaboration service 112 may be carried out, in some cases, via application programming interfaces (APIs). An API is an interface implemented by a program code component or hardware component (hereinafter "API-implementing component") that allows a different program code component or hardware component (hereinafter "API-calling component")

to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and, when implemented over the Internet, is commonly implemented as a set of Hypertext Transfer Protocol (HTTP) request messages and a specified format or structure for response messages according to a REST (Representational state transfer) or SOAP (Simple Object Access Protocol) architecture. For the collaboration service, the communication is bi-directional, and therefore can be implemented using HTTP/2, WebSocket, and other bi-directional protocols.

Figure 3A:
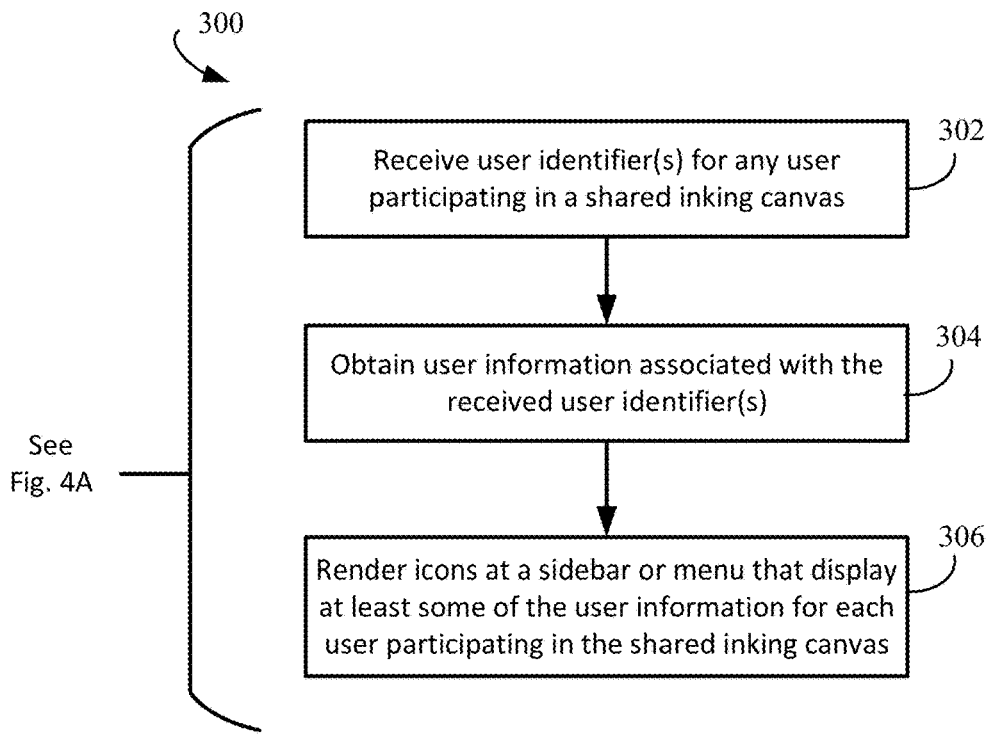
FIGS. 3A-3B illustrate example process flow diagrams for providing an ink presence enhanced inking.
Figure 3B:
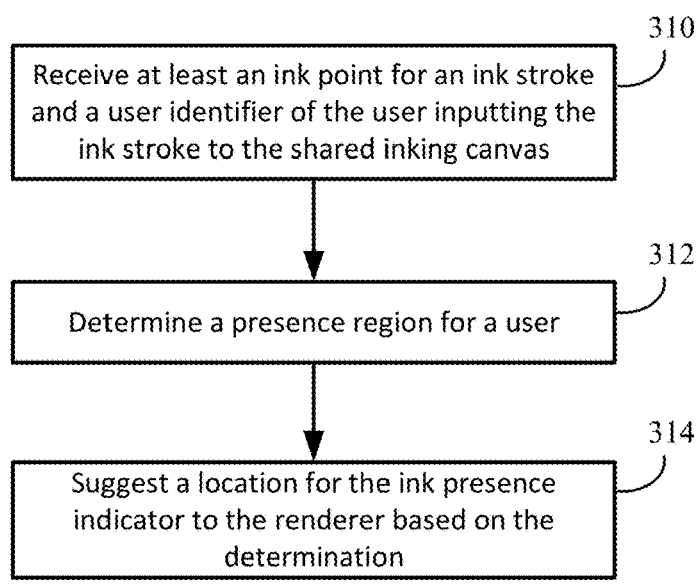
Figure 4A:
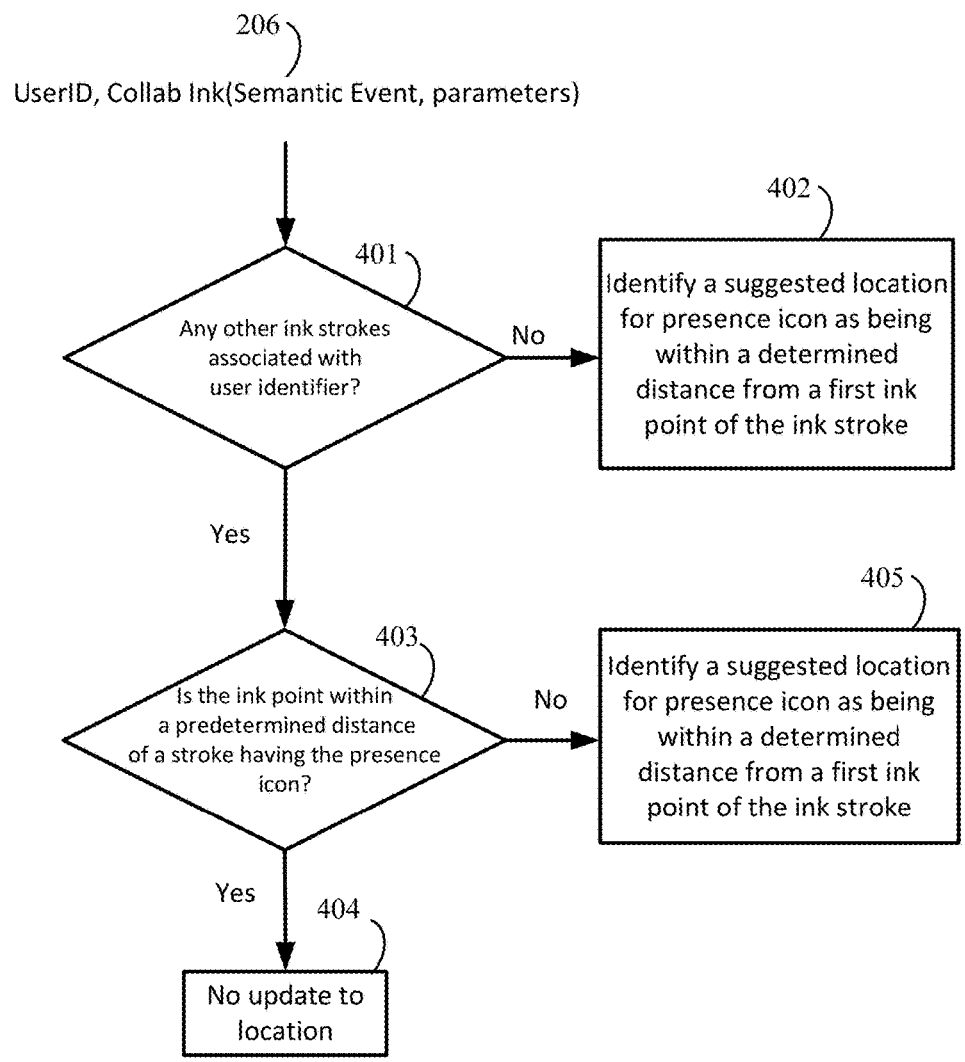
FIGS. 4A and 4B illustrate example logic carried out by the ink presence feature according to certain example implementations.
Figure 4B:
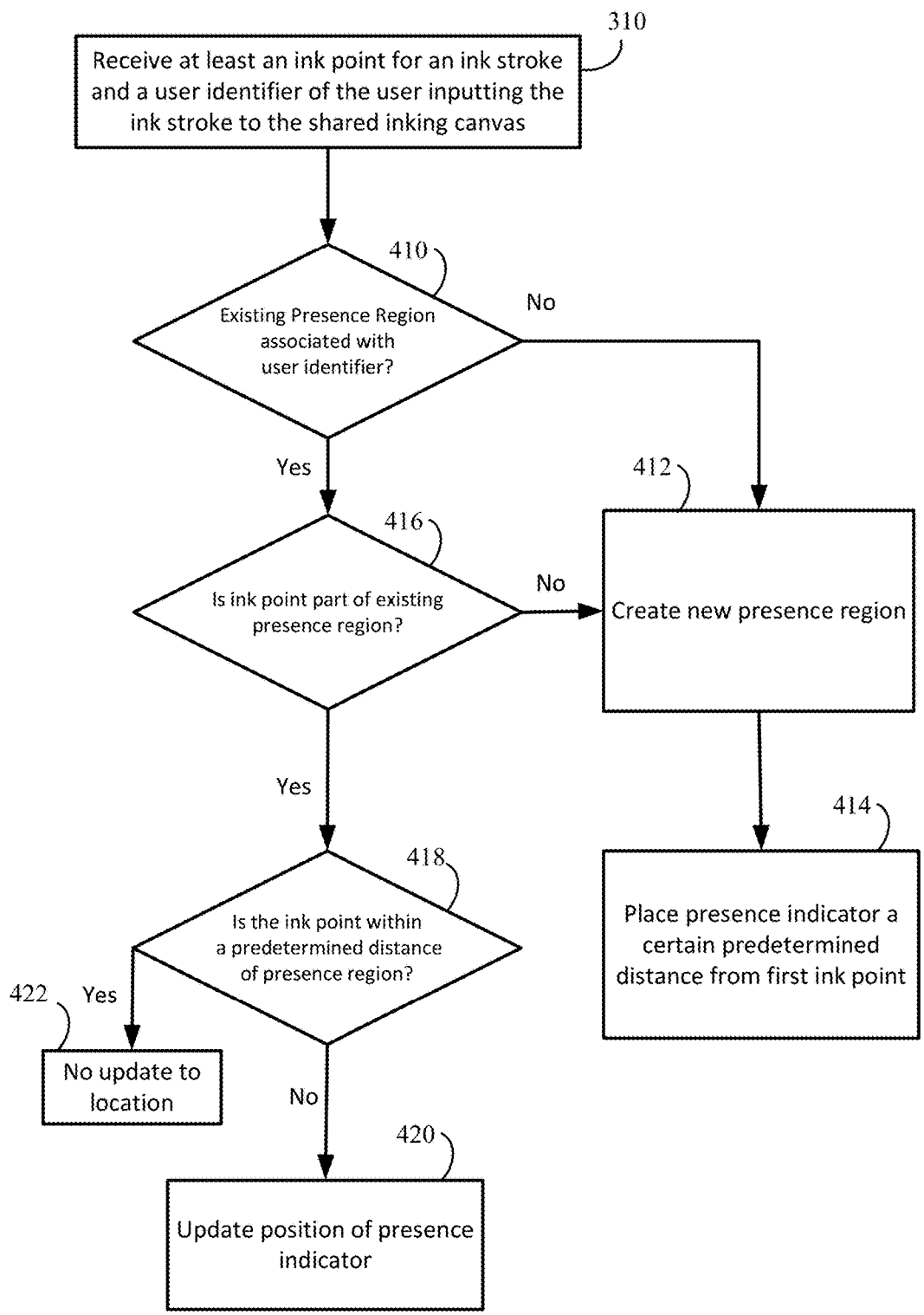
Figure 5A:
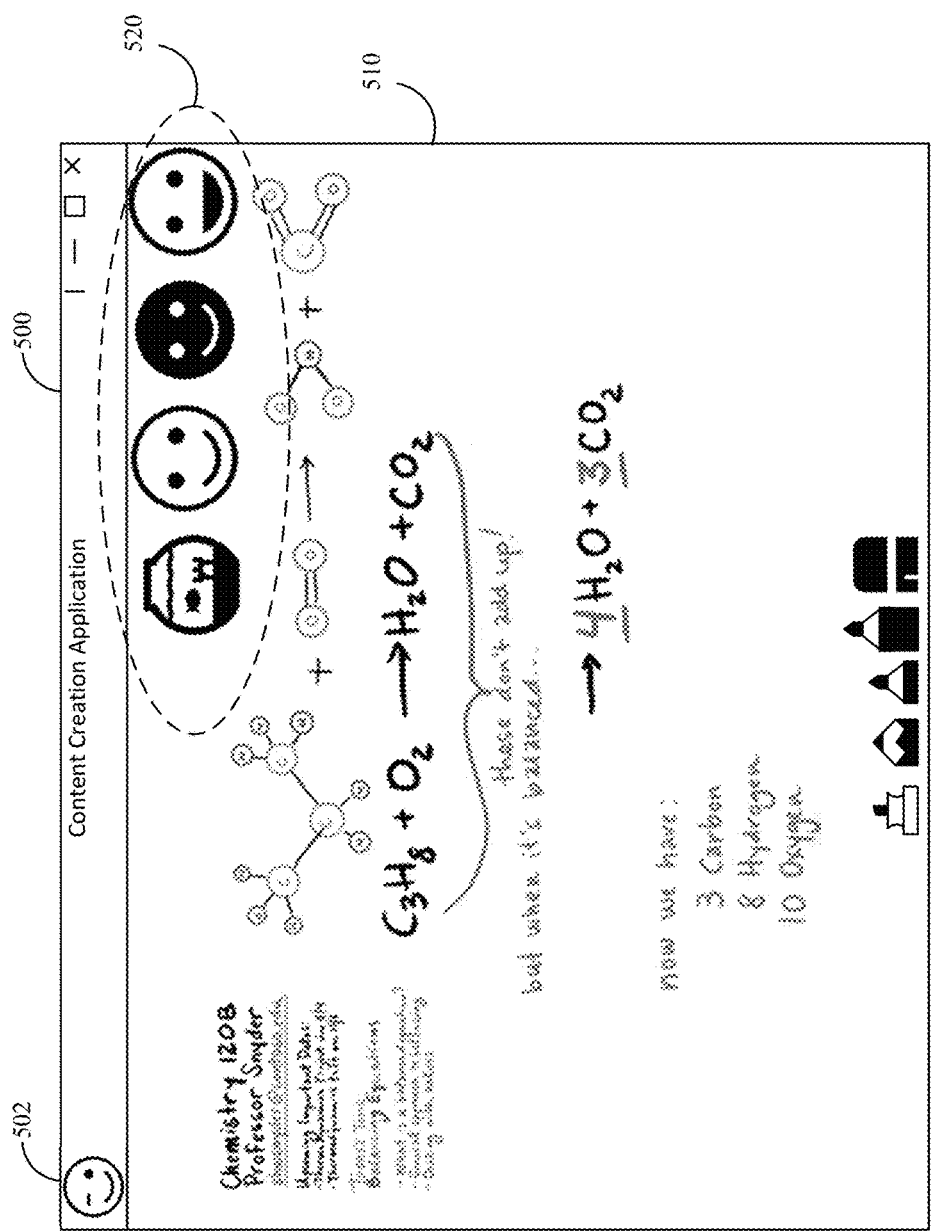
FIGS. 5A-5C illustrate an example scenario of an ink presence feature for a collaboration session.
Figure 5B:
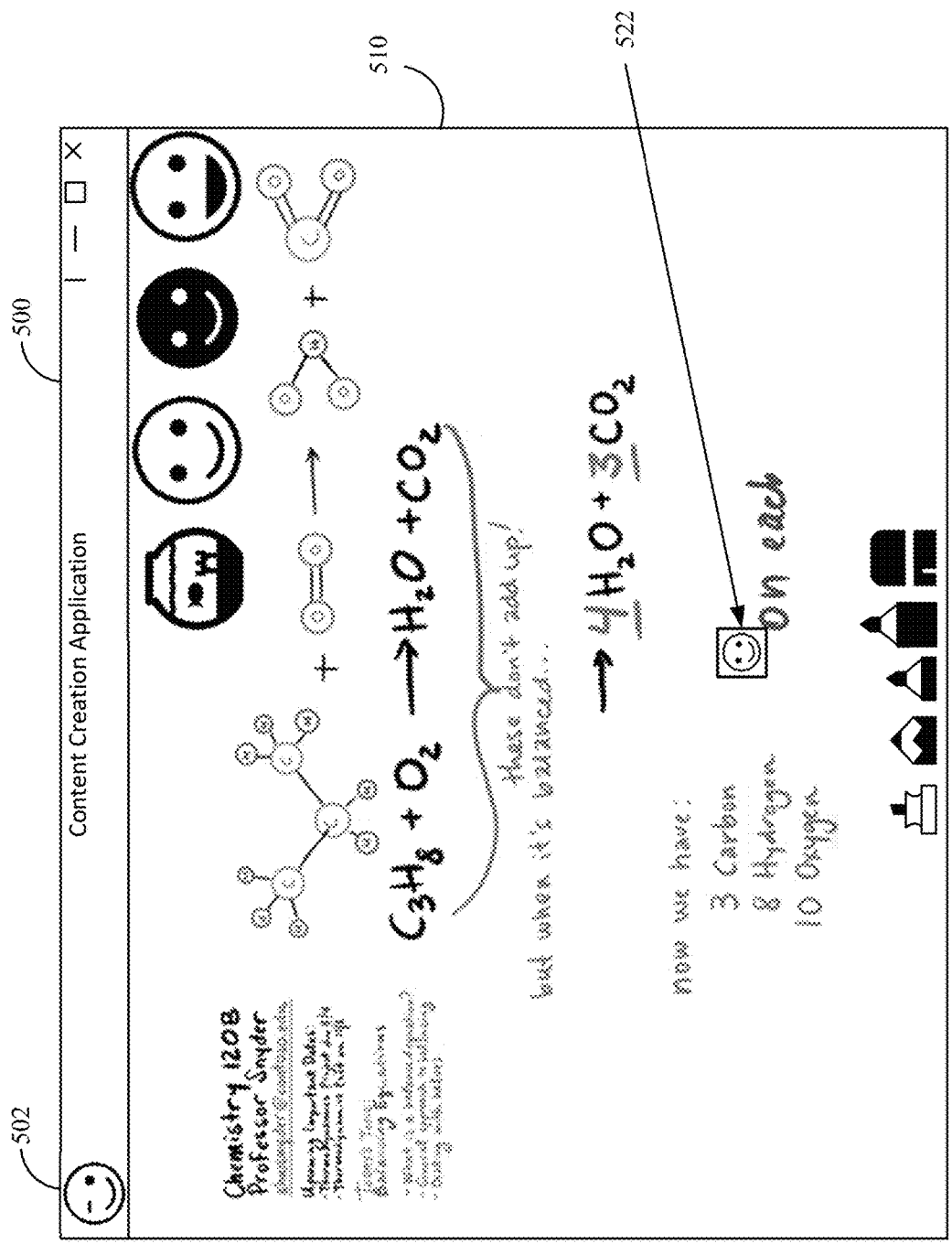
Figure 5C:
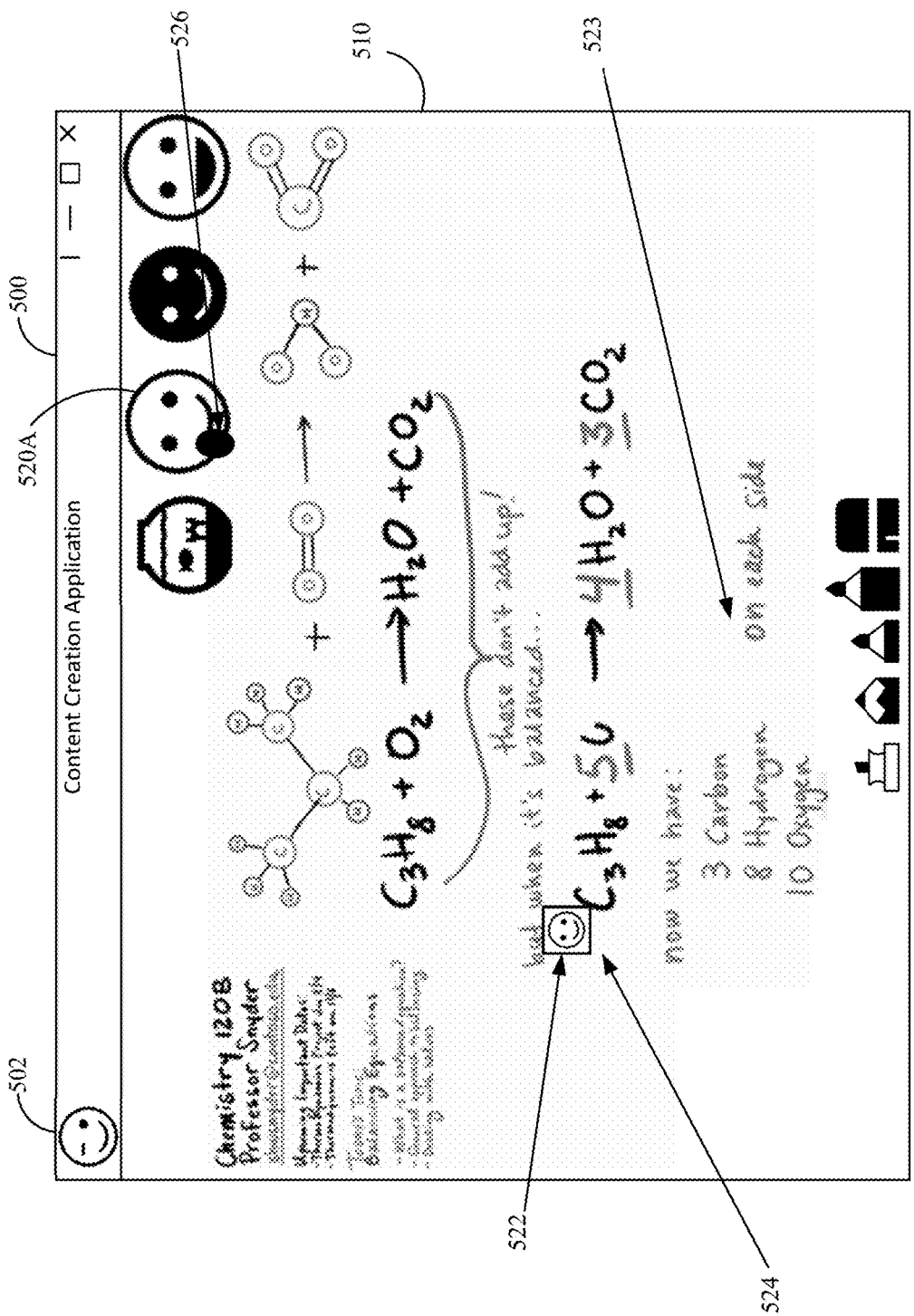

FIGS. 3A-3B illustrate example process flow diagrams for providing an ink presence enhanced inking; FIGS. 4A and 4B illustrate example logic carried out by the ink presence feature according to certain example implementations; and FIGS. 5A-5C illustrate an example scenario of an ink presence feature for a collaboration session. In the illustrated scenario, a content creation application 500 for a first user 502 is in a state with a shared canvas 510. As illustrated in FIG. 5A and described with respect to FIG. 3A, the participation of a number of users can, optionally, be represented using general presence indicators 520. For example, referring to FIG. 3A, in process 300, user identifier (s) for any user participating in a shared inking canvas (e.g., shared canvas 510) can be received (302) by an ink presence feature for the content creation application 500 at the first user's computing device. The ink presence feature can obtain (304) user information associated with the received user identifier(s). This may be accomplished by, for example, communication with a directory service. The general presence indicators 520 can indicate users that view the shared canvas 510, and are not necessarily limited to those users who are, or will be, inking on the shared canvas 510.

General presence indicators 520, for example in the form of icons can be rendered (306) at a sidebar or menu. At least some of the user information can be displayed for each user participating in the shared inking canvas 510. Although the general icons 520 are described as being generated and managed by the ink presence feature, the process 300 for general icons 520 may be handled separately. For example, process 300 be part of the collaboration-enabled content creation application. In other cases, the inclusion of general icons 520 (and process 300) is part of the ink presence feature, but just not carried out by the same feature as that determining the location for the presence indicator 208.

Referring to FIGS. 5B and 3B, in the illustrated scenario, one of the collaboration participants has been inking content to the shared canvas 510 via their user device (not shown). The ink presence feature of the content creation application 500 can receive (310) at least an ink point for an ink stroke and a user identifier of the user inputting the ink stroke to the shared canvas 410, determine (312) a presence region for the user, and suggest (314) a location for the ink presence indicator to the renderer based on the determination. The renderer receives the information from the presence manager (e.g., 108). The information can include where to place the icon and who the user is. The renderer then causes the presence icon 522 to surface. In addition, the presence manager 108 can inform the renderer to update the location of the presence icon as well as inform the renderer to remove an earlier icon.

The presence manager 108 or the presence renderer (e.g., object 106B) can obtain user information associated with the received user identifier(s). This may be accomplished by, for example, communication with a directory service. For example, when the renderer is told (by the presence manager) to draw a presence icon in the suggested location (e.g., suggested location 208 of FIG. 2), the renderer (e.g., object 206B of FIG. 2) checks if the user information is available. If not, the renderer provides a temporary icon with a randomly selected appropriate background color, and the renderer asynchronously attempts to get the user information (name, profile image etc.). Once the information is retrieved, the information can be cached so that for any future user information requests (in the same session) the information can be quickly retrieved by the renderer. This cache can be cleared on the user's sign-out of the shared canvas session. This same process can also, in some cases, be carried out for the general icons 520 mentioned above.

Each presence identifier can have its own unique identification. For example, the presence identifier icon itself can have its own identification as well as the user ID that is associated with it. The presence manager can communicate the indicator identifier and the user ID to the renderer along with the suggested location. This way the user who is inking at an upper right corner of a screen and in the bottom left corner of the screen at the same time can be represented by two different presence icons for the same user. Indeed, a single user could have multiple presence icons on a single page.

A presence region refers to the part of a display that contains a grouping of ink strokes (and other proximate content) that were input by a particular user. The presence region is based on proximity of content. For example, a presence region can be based on a bounding box of received ink points. A bounding box is a rectangle or other designated shape that is bounding a stroke. The bounding box can be considered the tightest square put around something (however, some implementations may add some area). If two different users are inking in the same area, there are two presence regions for each user. In some cases, if a new ink point happens to reside in two different presence regions belonging to the same user, then the presence manager can choose the best presence region based, for example on the location or time of the last stroke (or its point) that was added to each presence region. Indeed, there can be multiple presence regions for a user that could overlap or reside close together. The presence manager can decide between the presence regions (for assigning the ink point) based on the distance from the last stroke within that presence region, based on results from ink analysis, based on time (which presence region was the last presence region that consumed a stroke), or a combination thereof.

Distances between ink points are one way that the presence manager determines whether content is in a same presence region (and therefore the icon can stay at a suggested location). However, when processing bandwidth is large enough for it to be possible to analyze the inking within the time it takes for the ink to be rendered in real-time, an ink analysis could be carried out to determine groupings of ink strokes. For example, ink analysis can be used to identify letters, words, sentences, paragraphs, and/or drawings from the ink strokes. Ink analysis can use the characteristics of the ink strokes (e.g., weight, direction, pressure, color, and the like) and, in some cases, context, to determine groupings of strokes.

The presence manager code (e.g., presence manager 108), when executed by the user's computing device, can determine whether or not other ink strokes associated with the user identifier are in the shared inking canvas, determine whether or not the new ink stroke(s) is/are within a predetermined distance from the previous ink stroke (and/or determined presence region), and determine the time since a last stroke was input. As ink strokes from a single user comes in, the code (of the presence manager) can determine out if the ink strokes/points are close enough to each other to be considered part of the same 'presence region'. The ink strokes received by the collaboration-enabled content creation application include at least a start event and an end event. If there are multiple points that arrive in the same area/region, the presence icon does not move because, in certain embodiments, the icon should appear in one spot while the user writes the word. The presence manager can determine that the strokes are very close to each other (or use ink analysis) and only one presence icon is needed because there is a cluster of strokes in close proximity.

In one implementation, received ink information (e.g., collab ink 206A) is considered to be in the same presence region for a particular user if the new ink points are about a certain distance (e.g. 1.5 inches) from an existing presence region, in either x or y direction. If there is no existing presence region for the user, then the presence region is based on the bounding box of the live ink points. Based on the described approach, if the same user inks in two 'different areas of the screen' (from the user's perspective), two presence icons will appear for each presence region to bring attention to those separate regions and indicate who is inking.

For example, as illustrated in FIG. 4A, when ink information (e.g., user Id and Collab ink 206 of FIG. 2) is received (such as in operation 310 of FIG. 3B), the presence manager (e.g., 108) may determine (401) whether any other ink strokes are associated with the user identifier. If there are no other ink strokes previously received by that user, the presence manager can identify (402) a suggested location for the presence icon as being within a determined distance from a first ink point of the ink stroke. If there are other ink strokes received by that user, the presence manager may determine (403) whether the ink point is within a predetermined distance of a stroke having the presence icon. If there is an ink point within the predetermined distance, the presence manager does not have to update (404) the location of the presence icon for the renderer. If there is no ink point within the predetermined distance, then the presence manager can identify (405) a suggested location for the presence icon as being within a determined distance from a first ink point of the ink stroke.

As another example of operations 312 and 314, as illustrated in FIG. 4B, when ink strokes are received (e.g., after operation 310), the presence manager (e.g., 108) may determine (410) whether or not there is any existing presence region associated with the received user Id. In some cases, operation 410 may be carried out by identifying whether a presence indicator identifier is stored for a particular user identifier. In some cases, operation 410 may be carried out by identifying whether there exist any ink points associated with a particular user identifier that have been received and displayed within a predetermined amount of time. In some cases, a combination of these steps may be carried out.

If there is no existing presence region, the presence manager creates a new presence region (412). Creating the new presence region (412) can include identifying a bounding box of the received ink point. The bounding box may define the new presence region. After determining a suggested location, the presence manager communicates to the renderer to place a presence indicator a certain predetermined distance from the first ink point (414). If there is an existing presence region, the presence manager determines whether the new ink point is part of any existing presence regions (416). In some cases, operation 416 includes determining whether the ink point is within a predetermined distance from one or more ink points in the existing presence region or from the ink presence indicator for that existing presence region. In some cases, operation 416 includes performing ink analysis to determine whether the ink point is related to a prior ink point, the ink analysis identifying one or more of letters, words, sentences, paragraphs, or drawings. In some cases, operation 416 is a combination of these processes.

If the new ink is determined to be not part of any existing presence region, the presence manager creates the new presence region (412) and, after determining a suggested location, communicates to the renderer to place a presence indicator a certain predetermined distance from the first ink point (414). However, if the new ink is determined to be part of an existing presence region, the presence manager can determine whether the ink is within a predetermined distance from the presence region's indicator (418). If the presence manager determines that the ink is not within a predetermined distance from the presence region's indicator, the presence manager updates the position of the presence indicator (420) and communicates to the renderer the new suggested location. For example, the presence indicator can communicate the corresponding indicator identifier and the user ID to the renderer along with the suggested new location. If the presence manager determines that the ink is within a predetermined distance from the presence region's indicator, no update is made to change the location of the presence indicator (422).

Referring to FIG. 5C, in the illustrated scenario, based on the received ink strokes, presence icon 522 has moved from the first location 523 to the second location 524. As shown in the view of FIG. 5C, additional indications of who is writing can be included. For example, the general user's presence icon 520A may have a visual indicator applied (e.g., highlighting, color change, etc.) or a marker 526 can be displayed on the presence icon 520A to help facilitate who is an active participant as opposed to a participant that is merely viewing the shared canvas 510.

As mentioned above, the presence manager (e.g., 108) provides a suggested location to the renderer (e.g., object 106B). In some implementations, the rendering code of the renderer can move or otherwise adjust the presence icon to account for icon size or other factors with respect to the display.

In one implementation, the suggested first presence location of the presence indicator is the upper left corner of the first point in the presence region. Since the first position of the presence indicator is the first point, the subsequent location of the points does not have a strong effect on the best position of the presence icon. In some cases, particularly when context indicates languages that are written from right to left are used, the first presence location of the presence indicator may be the upper right corner of the presence region.

If the presence region starts to get larger, then another location for the presence indicator may be chosen. As a specific example, if the new ink points for a particular presence region is 600 pixels away from the previous suggested location, then the presence indicator can be moved closer to the new live ink points. It should of course be understood that other locations, resolution, and sizes are contemplated.

The presence manager can also communicate to the renderer to remove a presence icon (or other visual indicator) when conditions satisfy a remove event. In some implementations, when an end event (e.g., the semantic event of "end") is received for a live ink stroke, a counter can be started for x seconds (where x is a number of seconds). If no new points appear in that presence region by the end of the counter, the presence manager can determine that conditions satisfy the remove event and the presence indicator is to be removed. If a new live ink point is received by the presence manager, then the counter is cancelled. This is to give the illusion of the presence indicator disappearing after x seconds after the live ink user stopped inking in that area. If there are no live ink points coming into a presence region (not even an end event) for a predetermined amount of time, then the presence icon can also remove itself (e.g., the presence manager can determine that the condition satisfies a remove event). In some cases, the presence manager effectuates the removal of the presence icon by communicating the corresponding indicator identifier and the user ID to the renderer along with a command to remove the presence icon identified by the corresponding indicator identifier.

Figure 6:
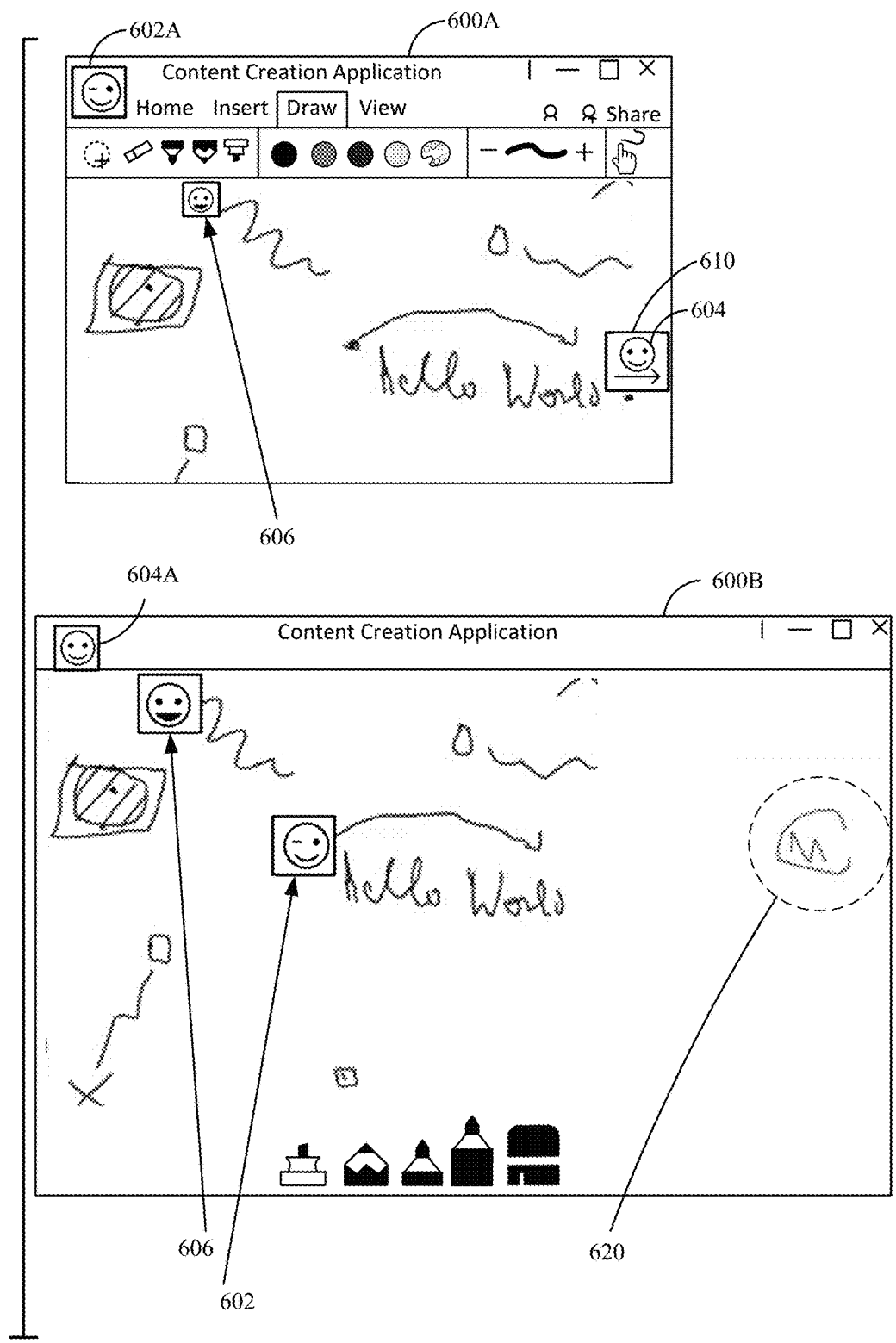
FIG. 6 illustrates example scenario of an ink presence feature where members of the collaboration group have different form-factor displays.

FIG. 6 illustrates example scenario of an ink presence feature where members of the collaboration group have different form-factor displays. Referring to FIG. 6, a first user 602A can be collaborating on a shared canvas using one content creation application 600A and a second user 604A can be collaborating on the shared canvas using another content creation application 600B that has a larger viewing canvas. The first user, the second user, and a third user are shown drawing in the shared canvas. A presence icon 606 for the third user is shown in the viewport of the content creation application 600A for the first user 602A and the viewport of the content creation application 600B for the second user 604. The second user can see a presence icon 602 of the first user 602A by the region the first user 602A is writing on the canvas. However, because of the difference in size of the viewports, the first user cannot see the writing of the second user (e.g., content 620). The renderer for the content creation application 600A can represent a location off screen by an off-screen indicator 610 with presence icon 604 of the second user 604A.

The off-screen indicator 610 can come to the edge of the screen to indicate that somebody is writing offscreen. In some cases, a presence icon could surface saying someone is inking right now and it could have functionality enabling a user to click on it and be taken to where someone was inking. The presence manager can provide the location information to facilitate the action for moving to the location of the writing. For example, in response to receiving an indication of selection of a presence icon (e.g., a tap), the user can be provided with an option to navigate to the live ink. The renderer may, in some cases, provide text or graphical information within the viewable region to convey that something is being written outside the viewable region. The location of this message may be at a border of the viewable region and/or in or around a general user presence indicator (e.g., 520 of FIG. 5A).

FIG. 7 illustrates components of a computing device that may be used in certain embodiments described herein.

Referring to FIG. 7, system 700 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 700 may be incorporated to implement a particular computing device.

System 700 includes a processing system 705 of one or more processors to transform or manipulate data according to the instructions of software 710 stored on a storage system 715.

Examples of processors of the processing system 705 include general purpose central processing units, graphics processing units, application specific processors, and logic devices, as well as any other type of processing device, combinations, or variations thereof. The processing system 705 may be, or is included in, a system-on-chip (SoC) along with one or more other components such as network connectivity components, sensors, video display components.

Software 710 may be implemented in program instructions and among other functions may, when executed by system 700 in general or processing system 705 in particular, direct system 700 or the one or more processors of processing system 705 to operate as described herein.

The software 710 can include an operating system 718 and application programs such as a content creation application 720 that includes the ink presence feature for real-time collaboration as described herein. Device operating systems generally control and coordinate the functions of the various components in the computing device, providing an easier way for applications to connect with lower level interfaces like the networking interface. It should be noted that the operating system may be implemented both natively on the computing device and on software virtualization layers running atop the native device operating system (OS). Virtualized OS layers, while not depicted in FIG. 7, can be thought of as additional, nested groupings within the operating system space, each containing an OS, application programs, and APIs.

Storage system 715 may comprise any computer readable storage media readable by the processing system 705 and capable of storing software 710 including the content creation application 720.

Storage system 715 may include volatile and nonvolatile memories, removable and non-removable media implemented in any method or technology for storage of information, such as computer readable instructions, data structures, program modules, or other data. Examples of storage media of storage system 715 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 715 may be implemented as a single storage device but may also be implemented across multiple storage devices or sub-systems co-located or distributed relative to each other. Storage system 715 may include additional elements, such as a controller, capable of communicating with processing system 705.

The system can further include user interface system 730, which may include input/output (I/O) devices and components that enable communication between a user and the system 700. User interface system 730 can include input devices such as a mouse, track pad, keyboard, a touch device for receiving a touch gesture from a user, a digitizer associated with a stylus or screen, a motion input device for detecting non-touch gestures and other motions by a user, a microphone for detecting speech, and other types of input devices and their associated processing elements capable of receiving user input.

The user interface system 730 may also include output devices such as display screen(s), speakers, haptic devices for tactile feedback, and other types of output devices. In certain cases, the input and output devices may be combined in a single device, such as a touchscreen display which both depicts images and receives touch gesture and inking input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form. The user interface system 730 may also include user interface software and associated software (e.g., for graphics chips and input devices) executed by the OS in support of the various user input and output devices. The associated software assists the OS in communicating user interface hardware events to application programs using defined mechanisms. The user interface system 730 including user interface software may support a graphical user interface, a natural user interface, or any other type of user interface. For example, the canvas interfaces with ink presence for the content creation application 720 described herein may be presented through user interface system 730.

Network interface 740 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Certain techniques set forth herein with respect to the content creation application and/or presence manager and/or renderer may be described in the general context of computer-executable instructions, such as program modules, executed by one or more hardware processors. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory propagating signals.

Although the subject matter has been described in language specific to structural features and/or acts, it is to be understood that the subject matter defined in the appended claims is not necessarily limited to the specific features or acts described above unless otherwise defined or disclaimed. Rather, the specific features and acts described above are disclosed as examples of implementing the claims and other equivalent features and acts are intended to be within the scope of the claims.

What is claimed is:

1. A method comprising:
    receiving, at a computing device, at least an ink point for an ink stroke and a user identifier of a user inputting the ink stroke to a shared inking canvas;
    determining, at the computing device, a presence region on the shared inking canvas for the user, wherein the presence region is a part of the shared inking canvas that contains a grouping of ink strokes from the user;
    determining, at the computing device, a suggested location for an ink presence indicator based on the ink point and the presence region; and
    rendering, at the computing device, the ink presence indicator in a graphical user interface displaying the shared inking canvas.

2. The method of claim 1, further comprising:
    removing the ink presence indicator from the graphical user interface in response to determining that conditions satisfy a remove event.

3. The method of claim 2, further comprising: starting a counter in response to receiving an end event for the ink stroke, wherein the conditions satisfy the remove event when the counter reaches a predetermined time before a new ink point is received.

4. The method of claim 2, wherein the conditions satisfy the remove event when no new ink point is received for the presence region within a predetermined amount of time.

5. The method of claim 1, wherein determining the presence region on the shared inking canvas for the user comprises:
    determining, at the computing device, whether there are any existing presence regions associated with the user identifier; and if it is determined that there is no existing presence region, creating a new presence region;

if it is determined that there is an existing presence region, determining, at the computing device, whether the ink point is related to the existing presence region;

if it is determined that the ink point is related to the existing presence region, identifying the presence region as the existing presence region;

if it is determined that the ink point is not related to the existing presence region, creating the new presence region.

6. The method of claim 5, wherein determining whether there are any existing presence regions comprises identifying whether a presence indicator identifier is stored for a particular user identifier.

7. The method of claim 5, wherein determining whether there are any existing presence regions comprises identifying whether there exist any ink points associated with a particular user identifier that have been received and displayed within a predetermined amount of time.

8. The method of claim 5, wherein creating the new presence region comprises identifying a bounding box of the received ink point.

9. The method of claim 5, wherein determining whether the ink point is related to the existing presence region comprises: determining whether the ink point is within a predetermined distance from one or more ink points in the existing presence region or from the ink presence indicator for that existing presence region.

10. The method of claim 5, wherein determining whether the ink point is related to the existing presence region comprises: performing ink analysis to determine whether the ink point is related to a prior ink point, the ink analysis identifying one or more of letters, words, sentences, paragraphs, or drawings.

11. The method of claim 5, wherein performing the determining of the suggested location for the ink presence indicator comprises:

if it is determined that there is no existing presence region, further placing the presence indicator a certain predetermined distance from the ink point of the new presence region;

if it is determined that the ink point is related to the existing presence region, determining whether the ink point is within a predetermined distance from the presence indicator for the existing presence region;

if it is determined that the ink point is within the predetermined distance, not updating the suggested location for the ink presence indicator;

if it is determined that the ink point is not within the predetermined distance, updating the suggested location for the ink presence indicator to be the certain predetermined distance from the ink point of the existing presence region;

if it is determined that the ink point is not related to the existing presence region, further placing the presence indicator the certain predetermined distance from the ink point of the new presence region.

12. The method of claim 1, wherein the determining the suggested location for the ink presence indicator based on the ink point and the presence region comprises:

providing the suggested location for the ink presence indicator as a location at a certain predetermined distance from a first received ink point for the presence region; and updating the location when the ink point is not within a predetermined distance of the ink presence indicator or the first received ink point for the presence region.

13. The method of claim 1, wherein the ink presence indicator comprises a presence icon, wherein the presence icon comprises a user's profile picture, initials, name, randomly selected background color or image, user-selected color or image, or combination thereof.

14. The method of claim 13, further comprising:
obtaining user information for the presence icon from a directory service.

15. A computer readable storage medium having stored thereon an ink presence feature of a content creation application that includes:

a presence manager code that, when executed by a computing device:

defines a presence region for where ink points are being drawn; and determines whether incoming ink points are part of a same presence region or different presence regions, wherein presence regions are part of a shared inking canvas that contain a grouping of ink strokes from a user; and a renderer code;

wherein the presence manager code, when executed by the computing device, determines a location for a presence indicator for each presence region and provides the location information to the renderer of the content creation application so that, when the renderer code is executed by the computing device, the presence indicator is displayed to a user via a graphical user interface of the content creation application.

16. The medium of claim 15, wherein the presence manager code comprises instructions that, when executed by the computing device, direct the computing device to at least:

determine, at the computing device, whether there are any existing presence regions associated with a user identifier; and if it is determined that there is no existing presence region, create a new presence region and determine the location for the presence indicator for the new presence region;

if it is determined that there is an existing presence region, determine, at the computing device, whether the ink point is related to the existing presence region;

if it is determined that the ink point is related to the existing presence region, determine the location for the presence indicator for that existing presence region;

if it is determined that the ink point is not related to the existing presence region, create the new presence region and determine the location for the presence indicator for the new presence region.

17. The medium of claim 16, wherein the presence manager code further comprises instructions that, when executed by the computing device, direct the computing device to further:

determine the location for the presence indicator for the new presence region by placing the presence indicator a certain predetermined distance from the ink point; and determine the location for the presence indicator for the existing presence region by determining whether the ink point is within a predetermined distance from the presence indicator for the existing presence region;

if it is determined that the ink point is within the predetermined distance, not updating the location for the presence indicator;

if it is determined that the ink point is not within the predetermined distance, updating the location for the presence indicator to be the certain predetermined distance from the ink point of the existing presence region.

18. A system comprising:
one or more hardware processors;
one or more storage media;
a communication interface;
a display;
a collaboration-enabled content creation application stored on at least one of the one or more storage media, that when executed by the one or more hardware processors direct the one or more hardware processors to at least:
receive, via the communication interface, at least an ink point for an ink stroke and a user identifier of a user inputting the ink stroke to a shared inking canvas;
determine a presence region on the shared inking canvas for the user, wherein the presence region is a part of the shared inking canvas that contains a grouping of ink strokes from the user;
determine a suggested location for an ink presence indicator based on the ink point and the presence region; and
render, to the display, the ink presence indicator in a graphical user interface displaying the shared inking canvas.

19. The system of claim 18, wherein the collaboration-enabled content creation application that directs the one or more hardware processors to determine the presence region on the shared inking canvas directs the one or more hardware processors to at least:
determine whether there are any existing presence regions associated with the user identifier; and
if it is determined that there is no existing presence region, create a new presence region;
if it is determined that there is an existing presence region, determine whether the ink point is related to the existing presence region;
if it is determined that the ink point is related to the existing presence region, identify the presence region as the existing presence region;
if it is determined that the ink point is not related to the existing presence region, create the new presence region.

20. The system of claim 18, wherein the collaboration-enabled content creation application that directs the one or more hardware processors to determine the suggested location for the ink presence indicator directs the one or more hardware processors to at least:
provide the suggested location for the ink presence indicator as a location at a certain predetermined distance from a first received ink point for the presence region; and
update the location when the ink point is not within a predetermined distance of the ink presence indicator or the first received ink point for the presence region.

* * * * *